US008180618B2

(12) United States Patent
Wagoner

(10) Patent No.: US 8,180,618 B2
(45) Date of Patent: May 15, 2012

(54) METHOD AND SYSTEM FOR INDUCTOR POWER LOSS ANALYSIS

(75) Inventor: Robert Gregory Wagoner, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 28 days.

(21) Appl. No.: 12/961,607

(22) Filed: Dec. 7, 2010

(65) Prior Publication Data

US 2012/0053910 A1    Mar. 1, 2012

(51) Int. Cl.
G06F 17/50    (2006.01)
(52) U.S. Cl. .......................................................... 703/13
(58) Field of Classification Search .................... 703/13; 29/606; 336/105; 702/130; 361/728; 323/222, 323/299; 320/166; 716/11
See application file for complete search history.

(56) References Cited

U.S. PATENT DOCUMENTS

| | | | | |
|---|---|---|---|---|
| 5,062,197 A * | 11/1991 | Ngo et al. | ........................ | 29/606 |
| 2006/0070015 A1 * | 3/2006 | Iwaki et al. | ........................ | 716/11 |
| 2007/0236187 A1 * | 10/2007 | Wai et al. | ........................ | 323/222 |
| 2007/0273335 A1 * | 11/2007 | Duff, Jr. | ........................ | 320/166 |
| 2007/0290668 A1 * | 12/2007 | Chou et al. | ........................ | 323/299 |
| 2008/0198560 A1 * | 8/2008 | Fujiwara et al. | ........................ | 361/728 |
| 2010/0286945 A1 * | 11/2010 | Tango et al. | ........................ | 702/130 |
| 2010/0321140 A1 * | 12/2010 | Tanaka et al. | ........................ | 336/105 |

OTHER PUBLICATIONS

Lu et al., "Computer modeling of micro-manufactured one-turn inductor", IEEE 2006.*
Cheng et al., "Calculation of winding losses in high frequency toroidal inductors using single strand conductors", IEEE 1994.*
Lee et al., "Development and validation of model for 95% efficiency, 220W wireless power transfer over a 30cm air-gap", IEEE 2010.*
Orlandi et al., "Optimization of shielded PCB air-core toroids for high efficiency dc-dc converters", IEEE 2009.*
An et al., "Flex reliability of RFID inlays assembled by anistropic conductive adhesive", IEEE 2007.*
Evans et al. "Reduction of proximity losses in coupled inductors", IEEE 1991.*
Ngo et al., "Effects of air gaps on winding losses in high-frequency planar magnetics", IEEE 1988.*

* cited by examiner

*Primary Examiner* — Kandasamy Thangavelu
(74) *Attorney, Agent, or Firm* — David A. Cornett; Ernest G. Cusick; Frank A. Landgraff

(57) ABSTRACT

Described herein are embodiments of a method and system for determining power loss in an inductor. In accordance with one aspect, a method is provided of determining power loss in an inductor. The method comprises modeling an inductor's windings and core using electromagnetic field simulation finite element analysis software executing on a computer. A ratio of AC resistance to DC resistance (Rac/Rdc) for the inductor is determined at one or more frequencies using the electromagnetic field simulation finite element analysis software. DC resistance (Rdc) of the windings is determined based on material properties and shape of the windings. The DC resistance is used to determine AC resistance (Rac) using the ratio, Rac/Rdc. Winding power loss at the one or more frequencies is determined based on the AC resistance (Rac). Core loss of the inductor is determined at the one or more frequencies using a core loss versus frequency curve. Winding power loss and core loss are summed at each of the one or more frequencies to determine total power loss at the respective frequency.

16 Claims, 2 Drawing Sheets

METHOD AND SYSTEM FOR INDUCTOR POWER LOSS ANALYSIS

BACKGROUND OF THE INVENTION

Switch mode power supplies and the use of solid-state power electronic devices that employ pulse-width modulation (PWM), as known to those of ordinary skill in the art, can cause frequencies on a power system well above and even below the fundamental power frequencies of 60 Hz. (U.S.) or 50 Hz (Europe). For example, solar inverters that employ PWM can impose frequencies from DC (0 Hz) up to over 100 KHz, sometimes with a combination of frequencies and waveshapes, such as a combination of a 60 Hz sine wave and also a 3 KHz triangle wave, that are seen by inductors associated with the device. These non-fundamental frequencies can create challenges in designing an inductor. For instance, purchasers of inductors generally prepare inductor specifications with high-level application requirements, such as inductance, current/frequency spectrum, power loss, etc. Actual detailed design of the inductors (core material, number of turns, size, etc.) was left up to the actual fabricators. Generally, these fabricators used rules of thumb based on 60 Hz. (or 50 Hz.) designs to estimate the losses due to eddy currents, and therefore do not accurately predict the actual power loss. Generally, the rules of thumb and fudge factors used when designing inductors are based on the inductor being exposed to only 60 Hz. or 50 Hz. frequencies. Inductors built based on 60 Hz. or 50 Hz. designs that are exposed to frequencies that are above (or even below) 60 Hz. or 50 Hz. can have unexpectedly high losses and cause excessive heating of the inductor. In some instances, such inductors must be reworked or scrapped and re-designed for failure to meet specifications.

Therefore, it is desired to have systems and methods of determining power loss in an inductor. It is further desired to have systems and methods of determining power loss in an inductor when the frequencies that the inductor is exposed to are not at the fundamental power frequency. Further, it is desired to be able to design such inductors with accurate estimation of power loss at the non-fundamental frequencies.

BRIEF DESCRIPTION OF THE INVENTION

In general, embodiments of the present invention provide an improvement by, among other things, providing a method and system for determining power loss in an inductor. In accordance with one aspect, a method is provided of determining power loss in an inductor. The method comprises modeling an inductor's windings and core using electromagnetic field simulation finite element analysis software executing on a computer. A ratio of AC resistance to DC resistance (Rac/Rdc) for the inductor is determined at one or more frequencies using the electromagnetic field simulation finite element analysis software. DC resistance (Rdc) of the windings is determined based on material properties and shape of the windings. The DC resistance is used to determine AC resistance (Rac) using the ratio, Rac/Rdc. Winding power loss at the one or more frequencies is determined based on the AC resistance (Rac). Core loss of the inductor is determined at the one or more frequencies using a core loss versus frequency curve. Winding power loss and core loss are summed at each of the one or more frequencies to determine total power loss at the respective frequency.

In accordance with another aspect, a system is provided for determining power loss in an inductor. In one embodiment, the system is comprised of a memory and a processor. The processor is operably connected with the memory. The processor is configured to model an inductor's windings and core using electromagnetic field simulation finite element analysis software stored in the memory and executed by the processor; determine a ratio of AC resistance to DC resistance (Rac/Rdc) for the inductor at one or more frequencies using the electromagnetic field simulation finite element analysis software; determine DC resistance (Rdc) of the windings based on material properties and shape of the windings, wherein the DC resistance is used to determine AC resistance (Rac) using the ratio, Rac/Rdc; determine winding power loss at the one or more frequencies based on the AC resistance (Rac); determine core loss of the inductor at the one or more frequencies using a core loss versus frequency curve stored in the memory; and sum, for each of the one or more frequencies, winding power loss and core loss.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF THE INVENTION

Figure 1:
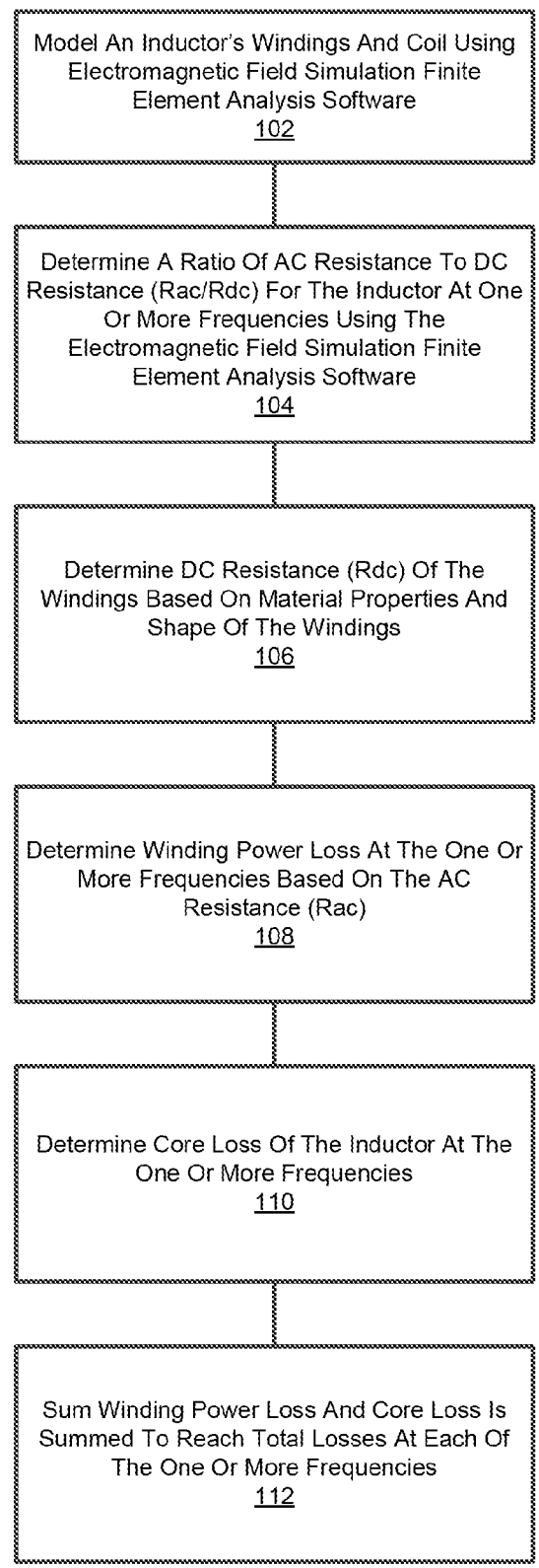
FIG. 1 is a flowchart showing an embodiment of steps of a method of determining power loss in an inductor.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. Further, when examples of ranges are provided herein, it is to be appreciated that the given ranges also include all subranges therebetween, unless specifically stated otherwise.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Described herein are embodiments of systems and methods for determining power loss in an inductor. As described herein, switch mode power supplies and the use of solid-state power electronic devices that employ pulse-width modulation (PWM) can cause frequencies on a power system well above the fundamental power frequencies of 60 Hz. (U.S.) and 50 Hz (Europe). For example, solar inverters that employ PWM can impose frequencies from DC (0 Hz) up to over 100 KHz, sometimes with a combination of frequencies and waveshapes, such as a combination of a 60 Hz sine wave and also a 3 KHz triangle wave, that are seen by inductors associated with the device. These non-fundamental frequencies can create challenges in designing an inductor. Generally, the rules of thumb and fudge factors used when designing inductors are based on the inductor being exposed to only 60 Hz. or 50 Hz. frequencies. Inductors built based on 60 Hz. or 50 Hz. designs that are exposed to frequencies that are above (or even below) 60 Hz. or 50 Hz. can have unexpectedly high losses and excessive heating can occur in the inductor. In some instances, such inductors must be reworked or scrapped and re-designed for failure to meet specifications. Therefore, it is desired to have systems and methods of determining power loss in an inductor when the frequencies that the inductor is exposed to are not at the fundamental power frequency. Further, it is desired to be able to design such inductors with accurate estimation of power loss at the non-fundamental frequencies.

The technical effect of embodiments described herein provides an improved method and system for determining losses in an inductor.

FIG. 1 is a flowchart showing an embodiment of steps of a method of determining power loss in an inductor. In one aspect, the inductor can be a single-phase inductor. In one aspect, the inductor can be a poly-phase inductor such as for example a three-phase inductor. In one aspect, the inductor can be used in a solar inverter. In one aspect, one or more of the steps can be implemented on a computing device such as the one described herein. At step 102, an inductor's windings and core are modeled using electromagnetic field simulation finite element analysis software executing on the computer. In one aspect, the windings can be aluminum. In one aspect, the windings can be copper or any other conductive material as known to one of ordinary skill in the art. In one aspect, the inductor's core and windings are modeled using two-dimensional (2-D) electromagnetic field simulation finite element analysis software as known to one of ordinary skill in the art executing on the computer. In one aspect, the inductor's core and windings are modeled using three-dimensional (3-D) electromagnetic field simulation finite element analysis software as known to one of ordinary skill in the art executing on the computer. In one aspect, the inductor's windings and core can be modeled using Ansoft Maxwell™ (2-D or 3-D) electromagnetic field simulation finite element analysis software (as available from ANSYS, Inc., Pittsburgh, Pa.) executing on the computer, though it is contemplated within the scope of embodiments of the invention that other electromagnetic field simulation finite element analysis software packages can be used.

At step 104, a ratio of AC resistance to DC resistance (Rac/Rdc) for the inductor is determined at one or more frequencies using the electromagnetic field simulation finite element analysis software executing on the computer. In one aspect, this comprises using the electromagnetic field simulation finite element analysis software to apply a current to each turn of the windings at 1 amp applied individually to each turn and using an eddy-current solver of the electromagnetic field simulation finite element analysis software to determine Rac/Rdc at the one or more frequencies using a sum of all ohmic power loss of all the windings. In one aspect, the sum of all ohmic power loss of all the windings is caused at least in part by a combination of skin effect, proximity effect, and fringing flux as described herein. In one aspect, determining the ratio of AC resistance to DC resistance (Rac/Rdc) for the inductor at one or more frequencies using the finite element analysis software comprises determining Rac/Rdc for various frequencies including for example one or more frequencies greater than 60 Hz.

At step 106, DC resistance (Rdc) of the windings is determined based on material properties and shape of the windings. Once determined, the DC resistance (Rdc) is used to determine AC resistance (Rac) using the ratio, Rac/Rdc that was determined in step 104, above. In one aspect, determining the DC resistance (Rdc) based on material properties and shape of the windings comprises determining the DC resistance (Rdc) based on bulk resistance and cross-sectional area and length of the windings. At step 108, winding power loss is determined at the one or more frequencies based on the AC resistance (Rac). At step 110, core loss of the inductor is determined at the one or more frequencies. In one aspect, this is performed using a core loss versus frequency curve. In one aspect, this step is performed using a computing device. At step 112, winding power loss and core loss is summed to reach total losses at each of the one or more frequencies.

Figure 2:
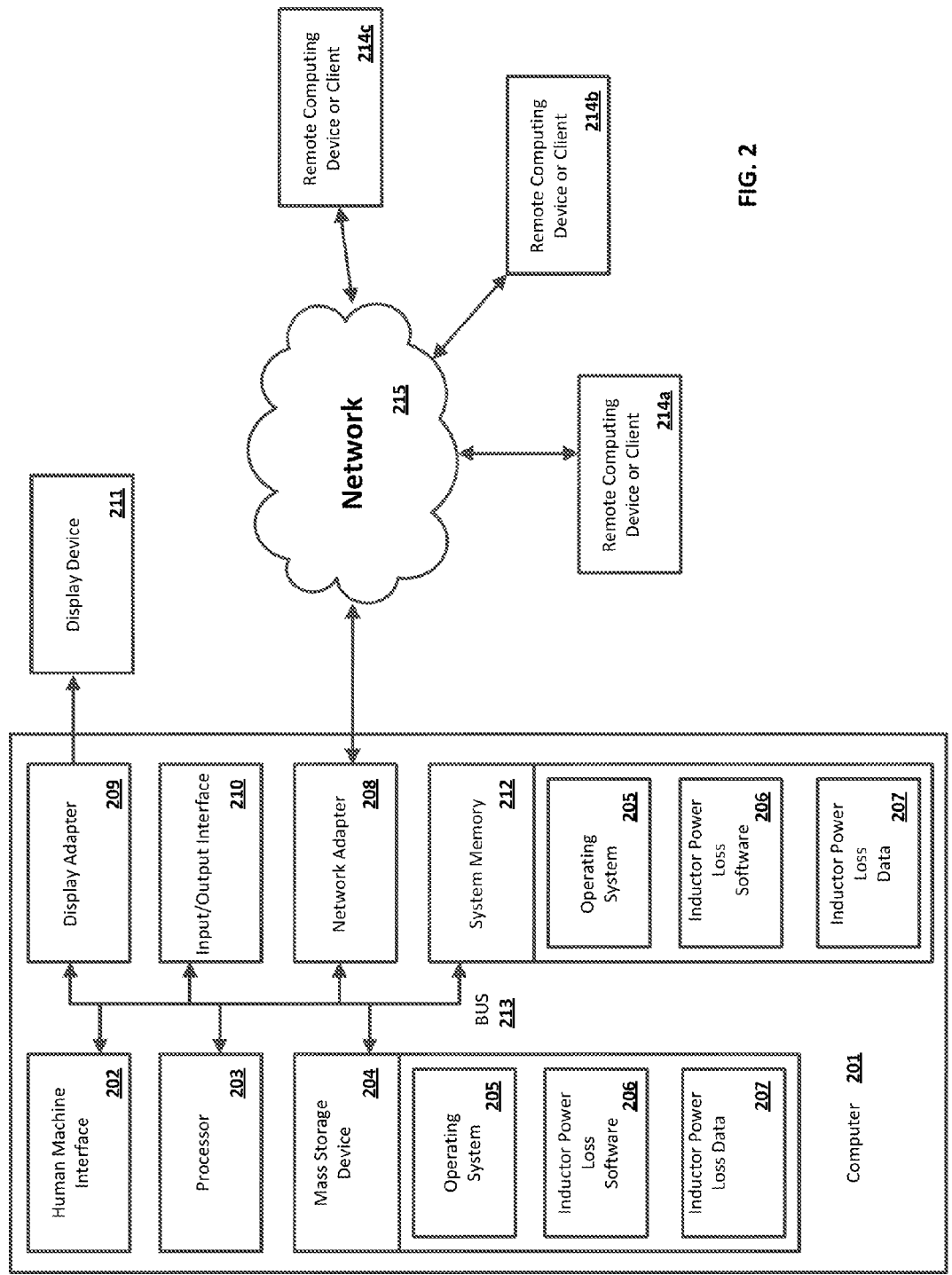
FIG. 2 is a block diagram illustrating an exemplary operating environment for performing the disclosed methods.

In one aspect, an embodiment of a system for implementing methods described herein can be comprised of units. One skilled in the art will appreciate that this is a functional description and that software, hardware, or a combination of software and hardware can perform the respective functions. A unit can be software, hardware, or a combination of software and hardware. The units can comprise the inductor power loss software 206 as illustrated in FIG. 2 and described below, which can include electromagnetic field simulation finite element analysis software as described herein. In one exemplary aspect, the units can comprise a computer 201 as illustrated in FIG. 2 and described below.

FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, smart meters, smart-grid components, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, inductor power loss software 306, inductor power loss data 207 that can include core loss versus frequency curves, a network adapter 208, system memory 212, an Input/Output Interface 210, a display adapter 209, a display device 211, and a human machine interface 202, can be contained within one or more remote computing devices or clients 214*a,b,c* at physically separate locations, connected through buses of this form, in effect implementing a fully distributed system or distributed architecture.

The computer 201 typically comprises a variety of computer readable media. Exemplary readable media can be any available media that is non-transitory and accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as inductor power loss data 207 and/or program modules such as operating system 205 and inductor power loss software 206 that are immediately accessible to and/or are presently operated on by the processing unit 203.

In another aspect, the computer 201 can also comprise other non-transitory, removable/non-removable, volatile/non-volatile computer storage media. By way of example, FIG. 2 illustrates a mass storage device 204 that can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and inductor power loss software 206. Each of the operating system 205 and inductor power loss software 206 (or some combination thereof) can comprise elements of the programming and the inductor power loss software 206. Inductor power loss data 207 can also be stored on the mass storage device 204. Inductor power loss data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown), which can be connected to the computer 201 via Input/Output Interface 210. Any step and/or result of the methods can be output in any form to an output device. Such output can be any form of visual representation, including, but not limited to, textual, graphical, animation, audio, tactile, and the like.

The computer 201 can operate in a networked environment using logical connections to one or more remote computing devices or clients 214a,b,c. By way of example, a remote computing device can be a personal computer, portable computer, a server, a router, a network computer, a peer device or other common network node, and so on. Logical connections between the computer 201 and a remote computing device or client 214a,b,c can be made via a local area network (LAN) and a general wide area network (WAN). Such network connections can be through a network adapter 208. A network adapter 208 can be implemented in both wired and wireless environments. Such networking environments are conventional and commonplace in offices, enterprise-wide computer networks, intranets, and other networks 215 such as the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of inductor power loss software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers, but some errors and deviations should be accounted for.

Described herein is an analysis of AC resistance in large sheet-wound three-phase inductor windings using finite element analysis (FEA). In one instance, the inductor is for example an aluminum sheet wound 3-phase inductor, GE p/n151X1227CM04PC01B, as available from General Electric Company, Salem, Va. As noted herein, at high frequency the power losses in inductor windings increase due to eddy currents caused by skin effect and proximity effect, resulting in increasing resistance as frequency is increasing. Another factor that can cause extra power loss in the winding is the core air gap fringing flux effect as described herein. A useful figure-of-merit in calculations of power loss is the AC resistance divided by the DC resistance, known as Rac/Rdc. This study revealed that the most accurate method of determination of Rac/Rdc is based on ohmic loss, instead of a sum of individual Rac/Rdc, because proximity effect can cause currents to flow in nearby conductors in the opposite direction from the desired current flow.

As described herein, a particular winding arrangement can be modeled using electromagnetic field simulation finite element analysis software such as for example Ansoft Maxwell™ (2-D or 3-D) electromagnetic field simulation finite element analysis software (as available from ANSYS, Inc., Pittsburgh, Pa.), or other similar software. Modeling using electromagnetic field simulation finite element analysis software provides a more accurate Rac/Rdc at various frequencies. Described herein are non-limiting examples of a few of the physical configurations studied where such examples are valuable to explain the concepts, though it is to be appreciated that the embodiments of systems and methods described herein are not limited to just the winding configurations described but can be applied to various other configurations.

Because of the complex geometries involved in an actual inductor, finite element analysis (FEA) modeling can be used to accurately determine the magnetic fields, ohmic losses, and resistances. FEA modeling can be performed in either 2D or 3D. For this study, Ansoft Maxwell™ software was used for both 2D and 3D FEA modeling, though other similar software can be used. FEA modeling breaks up the inductor into numerous small tetrahedra (3D) or triangles (2D). In order to achieve high accuracy, the size of the tetrahedra/triangles should be small, resulting in a large number of elements. While 3-D modeling of the entire inductor can be performed; however, for this study 2-D FEA modeling was used, breaking the inductor into sections representing the various geometries as cross section cuts through the inductor. For this analysis, the Eddy Current Solver module of the Ansoft Maxwell™ software can be used to determine the ohmic losses and allow calculation of the Rac/Rdc caused by the combination of skin effect, proximity effect, and fringing flux. These effects are described below.

A. Skin Effect

Skin effect in a conductor is a phenomenon where the current distribution in the conductor is nonlinear based on eddy currents caused by the current flowing through the conductor itself. In particular, skin effect causes the current to flow more at the outside edges of a conductor and less at the inside of a conductor. The current creates a flux, and the AC flux in the conductor causes eddy currents that oppose the original AC flux (Lenz's Law). The eddy currents act in a direction to reduce the current density in the center of the conductor, and increase the current density at the outside edges. The electric current tends to flow at the outside of the conductor, at an average depth called the skin depth, as calculated by the following formula:

$$\delta = \frac{1}{\sqrt{\pi \mu_0}} \sqrt{\frac{\rho}{\mu_r f}}$$

where $\delta$=skin depth in meters; $\mu_0$=magnetic permeability of free space ($\mu_0=4\pi \times 10^{-7}$ H/m); $\mu_r$=relative permeability of the medium (1.00 for copper and aluminum); $\rho$=resistivity of the medium in $\Omega \cdot m$ (for Copper, $\rho=1.68 \times 10^{-8}$ $\Omega \cdot m$; for Aluminum, $\rho=2.82 \times 10^{-8}$ $\Omega \cdot m$); and f=frequency in Hz.

B. Proximity Effect

The proximity effect in a conductor is a phenomenon where current in a conductor is created/influenced by magnetic fields generated from currents in nearby conductors in close proximity to each other. Alternating current in any conductor creates a changing magnetic field, which will influence the distribution of an electric current flowing within other nearby electrical conductors. Hence, the alternating magnetic field induces eddy currents in adjacent conductors, creating extra power loss in the adjacent conductors, as well as altering the distribution of current flowing through the adjacent conductors. Consequently, when current flows in a conductor, the proximity effect increases the Rac/Rdc of adjacent conductors, such that Rac/Rdc increases with increasing frequency. Proximity effect losses are highest in regions with the highest magnetic fields, such as multiple layer windings. The proximity effect is difficult to analyze accurately without using FEA software. Generic calculations using the Dowell method, based on Maxwell's equations, can be found at various sources. However, these generic calculations do not lead to accurate results for any specific inductor design, and therefore calculations will not be provided in this report. Generally, the outside layers of windings have significantly more resistance (greater Rac/Rdc) than the inside layers. Even as the number of winding layers is increased, the outside layers have significantly more resistance than the inside layers.

In some instances, intentional air ducts may be designed into the windings of inductors to allow for better cooling. The proximity effect is significantly impacted by the geometry and the spacing between the layers. Spacing the layers apart has the benefit of reducing the Rac/Rdc.

C. Core Air Gap Fringing Flux Effect

In some instances, intentional air gaps are designed into the cores of inductors to reduce the total permeability of the magnetic flux path and prevent core saturation. The inductance is determined by the number of turns and the core cross-sectional area, as well as the size of the air gap in the core. A small air gap significantly increases the effective length of the magnetic path, reducing the inductance, and simultaneously increasing the saturation current of the inductor. The magnetic flux path has two components, the core magnetic length and the air-gap length. The permeability of silicon iron is very high as long as the silicon iron is not saturated; the permeability of air is always 1, and consequently a small air gap can significantly affect the total permeability of the magnetic flux path.

The magnetic flux near the air gap does not remain within the core cross-section of the core, but instead, the magnetic flux bulges out at the edge of the core air gap curving outward, and this flux is known as "fringing" flux. As the fringing flux around the air gap cuts through a nearby winding, the eddy current causes extra losses in the nearby winding. Depending upon the geometry, particularly the distance between the winding to the core, the eddy current losses induced by the air gaps can exceed all the other losses combined. Induced gap losses decrease significantly as the ratio of Dwc/Agap is increased, where Dwc is the distance from the winding to core, and Agap is the air gap size. Hence large air gaps produce undesirable flux fringing, and ordinarily the total air gap is broken up into a number of smaller air gaps to reduce the extra winding power loss due to fringing flux. Losses in an inductor can be minimized by optimizing the gap locations. Analysis of inductors using the Ansoft Maxwell™ 2-D model shows that the fringing flux effect has more significant impact on Rac/Rdc than the combination of skin effect and proximity effect.

By analyzing a number of different inductors, equations can be developed to analyze inductor designs. Shown below are nine independent variables (X's) for the analysis of three-phase inductors with aluminum windings in close proximity to a magnetic core that includes air gaps. Excel™ Solver (Microsoft Corporation, Bellevue, Wash.) was used to find the parameters in the equation for Rac. The equation for Rac has been simplified down to the most important parameters, omitting the X's that were not significant for this analysis:

N is Number Turns (Layers)
Wsw_in Is Width of Sheet Winding (inches)
Tsw_in is Thickness of Sheet Winding (inches)
Ta_total is Thickness air space (ducts) between turns total (inches)
Dwc is Distance winding to core (inches)
Agap is Air gap length in each air gap (inches)
Ng is Total number of air gaps at a distance Dwc from the winding
f is Frequency (Hz)
Rdc is DC resistance at temp (ohms)
$\delta$ is skin depth for aluminum (meters)=

$\delta=(0.0000000282/\pi/f/4/\pi/0.0000001)^{\wedge}0.5$

Tsw_m is Thickness of Sheet Winding (meters)

Tsw_m=Tsw_in*0.0254

Rac is AC resistance (ohms)

$$Rac = Rdc * (1 + 0.00271759336 * (Tsw\_m/\delta)^{2.34077287} * N^{1.6363241} * (Wsw\_in/Tsw\_in))$$

Rac/Rdc is the ratio of AC resistance divided by DC resistance.

$$Rac/Rdc = Rac/Rdc$$

The equations described above are applicable to large inductors with aluminum windings, though similar equations can be developed for different inductor designs using different materials. The maximum error found for all cases was 39%. The average error is 15%. The range of aluminum sheet sizes studied are windings from 7.5" wide to 11.5" wide, and 0.09" thick to 0.126" thick. The range of frequencies studied is 10 Hz to 10 KHz. The range of number of turns is from 2 to 16. The range of total number of air gaps in the magnetic core studied is between 2 and 5 gaps per core leg. For these equations to be valid, there must be a magnetic core with air gaps in the core, resulting in fringing flux. The range of air gap sizes studied in for these equations is between 0.1" and 1.0". Within these ranges (and slightly beyond) the equations provided here are valid. TABLE I, below, shows the results of the above equations applied to a particular inductor design. Such a table can be used for quick analysis of an inductor design.

TABLE I

| | X's | | | | | | | |
|---|---|---|---|---|---|---|---|---|
| No. of Trns N | Wdth of Sheet Wndg (inch) Ww in | Thck. of Sheet Wndg (inch) Tw in | Freq. (Hz) F | DC Resist. at temp. (Ohm) Rdc | Skin Depth (meter) $\delta$ | Thick. of Sheet Winding (meter) Tw m | AC Resist. (Ohm) Rac | Ratio of AC Resist to DC Resist Rac/Rdc |
| 16 | 9.5 | 0.09 | 10 | 0.00076 | 0.0267267 | 0.002286 | 0.000824 | 1.085 |
| 16 | 9.5 | 0.09 | 60 | 0.00076 | 0.0109111 | 0.002286 | 0.001285 | 1.690 |
| 16 | 9.5 | 0.09 | 300 | 0.00076 | 0.0048796 | 0.002286 | 0.004211 | 5.541 |
| 16 | 9.5 | 0.09 | 1000 | 0.00076 | 0.0026727 | 0.002286 | 0.014884 | 19.584 |
| 16 | 9.5 | 0.09 | 3000 | 0.00076 | 0.0015431 | 0.002286 | 0.051853 | 68.228 |
| 16 | 9.5 | 0.09 | 10000 | 0.00076 | 0.0008452 | 0.002286 | 0.209849 | 276.117 |

TABLE II, below, shows a comparison of the Rac/Rdc actually measured in a lab for a GE151X1227CM04PC01B inductor to the Rac/Rdc results from the Ansoft Maxwell™ 2-D model for this inductor and to the Rac/Rdc results from the equations described above. As can be seen in TABLE II, The Ansoft Maxwell™ 2-D model for this particular inductor closely matches the measured test data. The equations have higher error, but are still useful to quickly get a rough idea of the performance of a particular winding configuration.

TABLE II

| Frequency Hz | Lab test data Rac/Rdc | FEA model Rac/Rdc | Equations Rac/Rdc | FEA model error | Equations error |
|---|---|---|---|---|---|
| 0 | 1.000 | 1 | 1.000 | 0.0% | 0.0% |
| 10 | 1.040 | 1.034 | 1.085 | −0.6% | 4.3% |
| 60 | 1.339 | 1.413 | 1.690 | 5.5% | 26.2% |
| 300 | 4.121 | 4.018 | 5.541 | −2.5% | 34.5% |
| 1,000 | 17.482 | 16.328 | 19.58 | −6.6% | 12.0% |
| 3,000 | 88.829 | 93.019 | 68.23 | 4.7% | −23.2% |
| 10,000 | 379.14 | 381.90 | 276.12 | 0.7% | −27.2% |

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of determining power loss in an inductor comprising:
    modeling an inductor's windings and core using electromagnetic field simulation finite element analysis software executing on a computer;
    determining a ratio of AC resistance to DC resistance (Rac/Rdc) for the inductor at one or more frequencies using the electromagnetic field simulation finite element analysis software, wherein the electromagnetic field simulation finite element analysis software causes a 1 amp current to be applied individually to each turn of the windings and an eddy-current solver of the electromagnetic field simulation finite element analysis software is used to determine Rac/Rdc at the one or more frequencies using a sum of all ohmic power loss of all the windings;
    determining DC resistance (Rdc) of the windings based on material properties and shape of the windings, wherein the DC resistance is used to determine AC resistance (Rac) using the ratio, Rac/Rdc;

determine winding power loss at the one or more frequencies based on the AC resistance (Rac);

determine core loss of the inductor at the one or more frequencies using a core loss versus frequency curve; and summing, for each of the one or more frequencies, winding power loss and core loss.

2. The method of claim 1, wherein modeling an inductor's windings and core using electromagnetic field simulation finite element analysis software executing on a computer comprises modeling the inductor's windings and core using two-dimensional (2-D) electromagnetic field simulation finite element analysis software executing on a computer.

3. The method of claim 1, wherein modeling an inductor's windings and core using electromagnetic field simulation finite element analysis software executing on a computer comprises modeling the inductor's windings and core using three-dimensional (3-D) electromagnetic field simulation finite element analysis software executing on a computer.

4. The method of claim 1, wherein the sum of all ohmic power loss of all the windings is caused at least in part by a combination of skin effect, proximity effect, and fringing flux.

5. The method of claim 1, wherein determining the DC resistance (Rdc) based on material properties and shape of the windings comprises determining the DC resistance (Rdc) based on bulk resistance and cross-sectional area and length of the windings.

6. The method of claim 1, wherein determining the ratio of AC resistance to DC resistance (Rac/Rdc) for the inductor at one or more frequencies using the finite element analysis software comprises determining Rac/Rdc for one or more frequencies greater than 60 Hz.

7. The method of claim 1, wherein the method is used to determine power loss in an inductor that is used in a solar inverter.

8. The method of claim 1, wherein the method of determining power loss in an inductor comprises a method of determining power loss in a poly-phase inductor.

9. A system for determining power loss in an inductor comprised of:

a memory; and a processor operably connected with the memory, wherein said processor is configured to:

model an inductor's windings and core using electromagnetic field simulation finite element analysis software stored in the memory and executed by the processor;

determine a ratio of AC resistance to DC resistance (Rac/Rdc) for the inductor at one or more frequencies using the electromagnetic field simulation finite element analysis software, wherein the electromagnetic field simulation finite element analysis software causes a 1 amp current to be applied individually to each turn of the windings and an eddy-current solver of the electromagnetic field simulation finite element analysis software is used to determine Rac/Rdc at the one or more frequencies using a sum of all ohmic power loss of all the windings;

determine DC resistance (Rdc) of the windings based on material properties and shape of the windings, wherein the DC resistance is used to determine AC resistance (Rac) using the ratio, Rac/Rdc;

determine winding power loss at the one or more frequencies based on the AC resistance (Rac);

determine core loss of the inductor at the one or more frequencies using a core loss versus frequency curve stored in the memory; and sum, for each of the one or more frequencies, winding power loss and core loss.

10. The system of claim 9, wherein the processor configured to model an inductor's windings and core using electromagnetic field simulation finite element analysis software executing on the processor comprises the processor configured to model the inductor's windings and core using two-dimensional (2-D) electromagnetic field simulation finite element analysis software executing on the processor.

11. The system of claim 9, wherein the processor configured to model an inductor's windings and core using electromagnetic field simulation finite element analysis software executing on the processor comprises the processor configured to model the inductor's windings and core using three-dimensional (3-D) electromagnetic field simulation finite element analysis software executing on the processor.

12. The system of claim 9, wherein the sum of all ohmic power loss of all the windings is caused at least in part by a combination of skin effect, proximity effect, and fringing flux.

13. The system of claim 9, wherein the processor configured to determine the DC resistance (Rdc) based on material properties and shape of the windings comprises the processor configured to determine the DC resistance (Rdc) based on bulk resistance and cross-sectional area and length of the windings.

14. The system of claim 9, wherein the processor configured to determine the ratio of AC resistance to DC resistance (Rac/Rdc) for the inductor at one or more frequencies using the finite element analysis software comprises the processor configured to determine Rac/Rdc for one or more frequencies greater than 60 Hz.

15. The system of claim 9, wherein the system is used to determine power loss in an inductor that is used in a solar inverter.

16. The system of claim 9, wherein the system is used to determine power loss in a poly-phase inductor.

* * * * *